US011162567B2

(12) United States Patent
Rowntree et al.

(10) Patent No.: US 11,162,567 B2
(45) Date of Patent: Nov. 2, 2021

(54) CONTROL OF A CONTINUOUSLY VARIABLE TRANSMISSION IN A MIXER

(71) Applicant: KUHN NORTH AMERICA, INC., Brodhead, WI (US)

(72) Inventors: Bryan Rowntree, Brodhead, WI (US); Léandre Guidault, La Copechagnière (FR); Rodney Zimmerman, New Glarus, WI (US)

(73) Assignee: KUHN NORTH AMERICA, INC., Brodhead, WI (US)

( * ) Notice: Subject to any disclaimer, the term of this patent is extended or adjusted under 35 U.S.C. 154(b) by 0 days.

(21) Appl. No.: 16/865,127

(22) Filed: May 1, 2020

(65) Prior Publication Data

US 2020/0347920 A1 Nov. 5, 2020

Related U.S. Application Data

(60) Provisional application No. 62/843,023, filed on May 3, 2019.

(51) Int. Cl.
| | | |
|---|---|---|
| *F16H 47/04* | (2006.01) | |
| *A01K 5/00* | (2006.01) | |
| *F16H 45/00* | (2006.01) | |

(52) U.S. Cl.
CPC .............. *F16H 47/04* (2013.01); *A01K 5/001* (2013.01); *F16H 2045/002* (2013.01); *F16H 2045/005* (2013.01); *F16H 2047/045* (2013.01)

(58) Field of Classification Search
CPC ............... F16H 47/04; F16H 2047/045; F16H 2045/002; F16H 2045/005; A01K 5/001
See application file for complete search history.

(56) References Cited

U.S. PATENT DOCUMENTS

| | | | | |
|---|---|---|---|---|
| 5,683,322 A | * | 11/1997 | Meyerle | .................. B60T 1/093 |
| | | | | 475/72 |
| 2003/0150662 A1 | | 8/2003 | Tani | |
| 2004/0132567 A1 | | 7/2004 | Schonnenbeck | |
| 2011/0099993 A1 | | 5/2011 | Ishii et al. | |
| 2017/0167580 A1 | * | 6/2017 | Bondioli | ............. F16H 37/0806 |
| 2018/0259040 A1 | | 9/2018 | Liet | |
| 2019/0366287 A1 | | 12/2019 | Rowntree et al. | |
| 2020/0056681 A1 | | 2/2020 | Bondioli | |

FOREIGN PATENT DOCUMENTS

| | | |
|---|---|---|
| EP | 3 179 133 A1 | 6/2017 |
| JP | 2009-97646 A | 5/2009 |
| WO | WO 02/064999 A1 | 8/2002 |

OTHER PUBLICATIONS

Extended European Search Report dated Sep. 14, 2020 in corresponding European Patent Application No. 20172630.4, 7 pages.

* cited by examiner

*Primary Examiner* — Huan Le
(74) *Attorney, Agent, or Firm* — Oblon, McClelland, Maier & Neustadt, L.L.P.

(57) ABSTRACT

A transmission system for a feed mixer including a continuously variable transmission (CVT) is provided. The CVT includes a mechanical loop and a hydrostatic loop. The CVT is operated so that the mechanical portion of the CVT is prevented from overtaking the hydrostatic portion of the CVT at start up of the CVT.

16 Claims, 10 Drawing Sheets

CONTROL OF A CONTINUOUSLY VARIABLE TRANSMISSION IN A MIXER

CROSS-REFERENCE TO RELATED APPLICATIONS

This application claims the benefit of U.S. Provisional Application No. 62/843,023, filed on May 3, 2019, the entire content of which is incorporated in the present document by reference.

BACKGROUND OF THE INVENTION

Field of the Invention

The present disclosure is directed to a transmission system for a mixer. A mixer is a machine used to mix feeds and concentrates to produce complete and homogeneous feeds to be distributed to animals. Specifically, the present disclosure is directed to a continuously variable transmission (CVT) applied to a livestock feed mixer.

Description of the Related Art

Farms have grown larger than ever in recent years. As they have grown, farms have become more conscientious financially and environmentally. There is a need to conduct work more efficiently to avoid wasting these resources. In the spirit of this efficiency, is the desire to mix feed quickly and effectively, using less energy.

It is known in the current art, to utilize a continuously variable transmission (CVT) on a feed mixer to lower the power requirements for mixing feed. As indicated in the document EP 3179133, the driving speed of the mixing members is different depending on the phase of use of the mixer. During loading and mixing, the required driving speed can be qualified as medium and variable depending on the type of fodder loaded in the tank. When moving the mixer loaded with the mixed feed to the barn, the driving speed of the mixing screws is rather low or very low while during the distribution of the feed, the drive speed is high.

It is also known to control a CVT system to start the CVT in an off-center position to reduce the torque needed begin rotation of the mixing members, as indicated in U.S. application Ser. No. 15/994,610. This off-center start reduces the speed of the output of the CVT quicker. However, it increases the burden on the hydrostatic loop of the CVT. In high load situations, this scenario can lead to the mechanical loop of the CVT overtaking the hydrostatic loop of the CVT leading to failure of the CVT.

SUMMARY OF THE INVENTION

A goal of the current disclosure is provide a transmission system for a feed mixer in which the mechanical portion of the CVT is prevented from overtaking the hydrostatic portion of the CVT.

Accordingly, one aspect of the present invention is a feed mixer for mixing materials for livestock feed, comprising: a container that receives materials; a first driveline to transfer power from a power source; a second driveline to transfer power to at least a first mixing member gearbox; a first mixing member for mixing materials, drivingly attached to the first mixing member gearbox; a first opening for discharging the material from the container; and a transmission system. The transmission system includes a continuously variable transmission comprising a mechanical loop and a hydrostatic loop. The mechanical loop includes an input, driven by the first driveline; an output, which drives the second driveline; and a planetary gear set. The hydrostatic loop includes a first pump to create a primary flow of fluid; a closed circuit; a reservoir; a first motor driven by the primary flow of fluid from the first pump.

In one embodiment, the hydrostatic loop further includes a second pump to create a secondary flow of fluid from the reservoir, to incorporate into the closed circuit prior to the rotation of the input.

In another embodiment, the hydrostatic loop further includes a direct drive pump drivingly connected to the input to create a direct flow of fluid, and an accumulator to pressurize the closed circuit prior to the rotation of the output.

In another embodiment, the mechanical loop further include a clutch provided between the input and the output, in which the clutch is configured to disengage when a pressure of the closed circuit is below a predetermined threshold, and is configured to engage when the pressure of the closed circuit is above the predetermined threshold.

BRIEF DESCRIPTION OF THE DRAWINGS

These and other advantages of the invention will become more apparent and more readily appreciated from the following detailed description of the exemplary embodiments of the invention taken in conjunction with the accompanying drawings where.

DETAILED DESCRIPTION OF THE PREFERRED EMBODIMENTS

Figure 1:
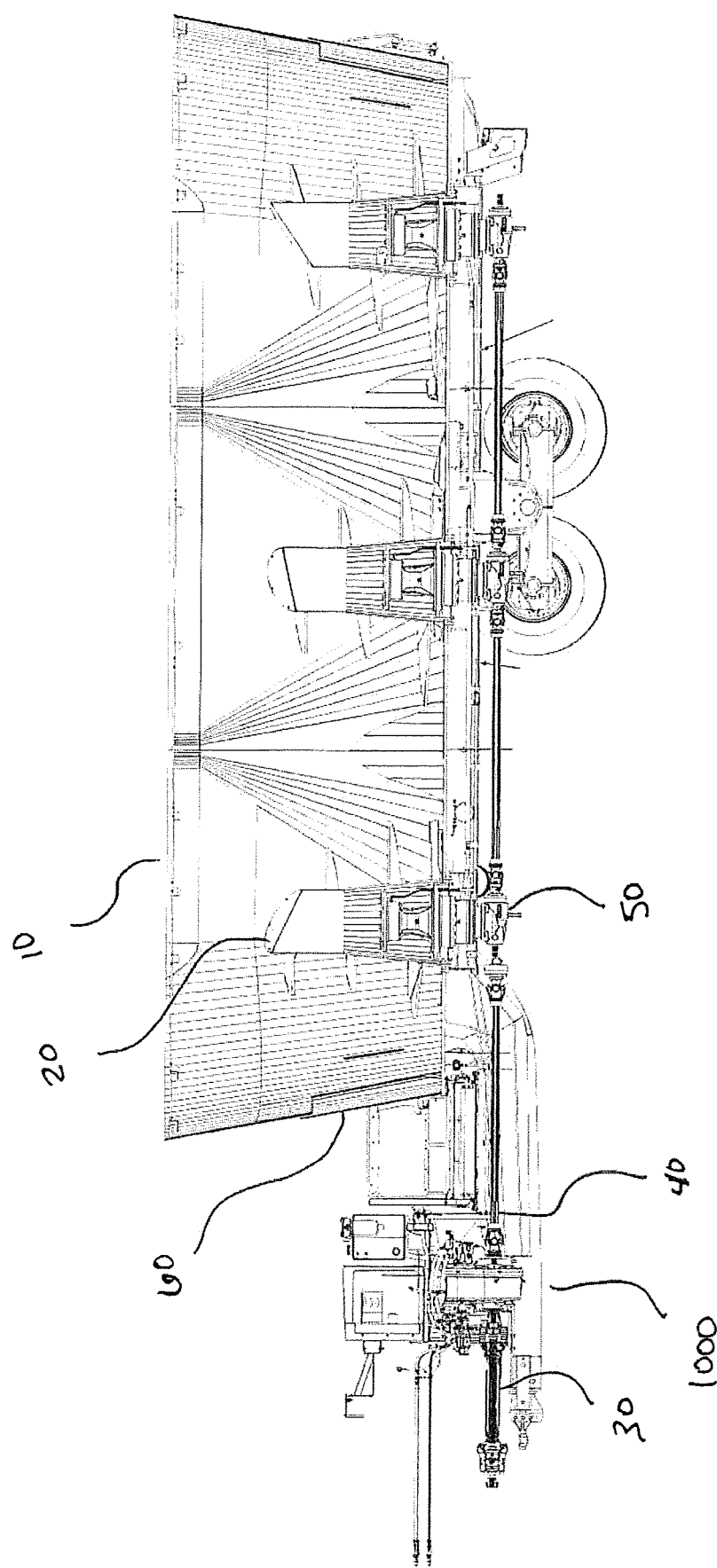
FIG. 1 is a side view of a feed mixer according to one embodiment.
Figure 2:
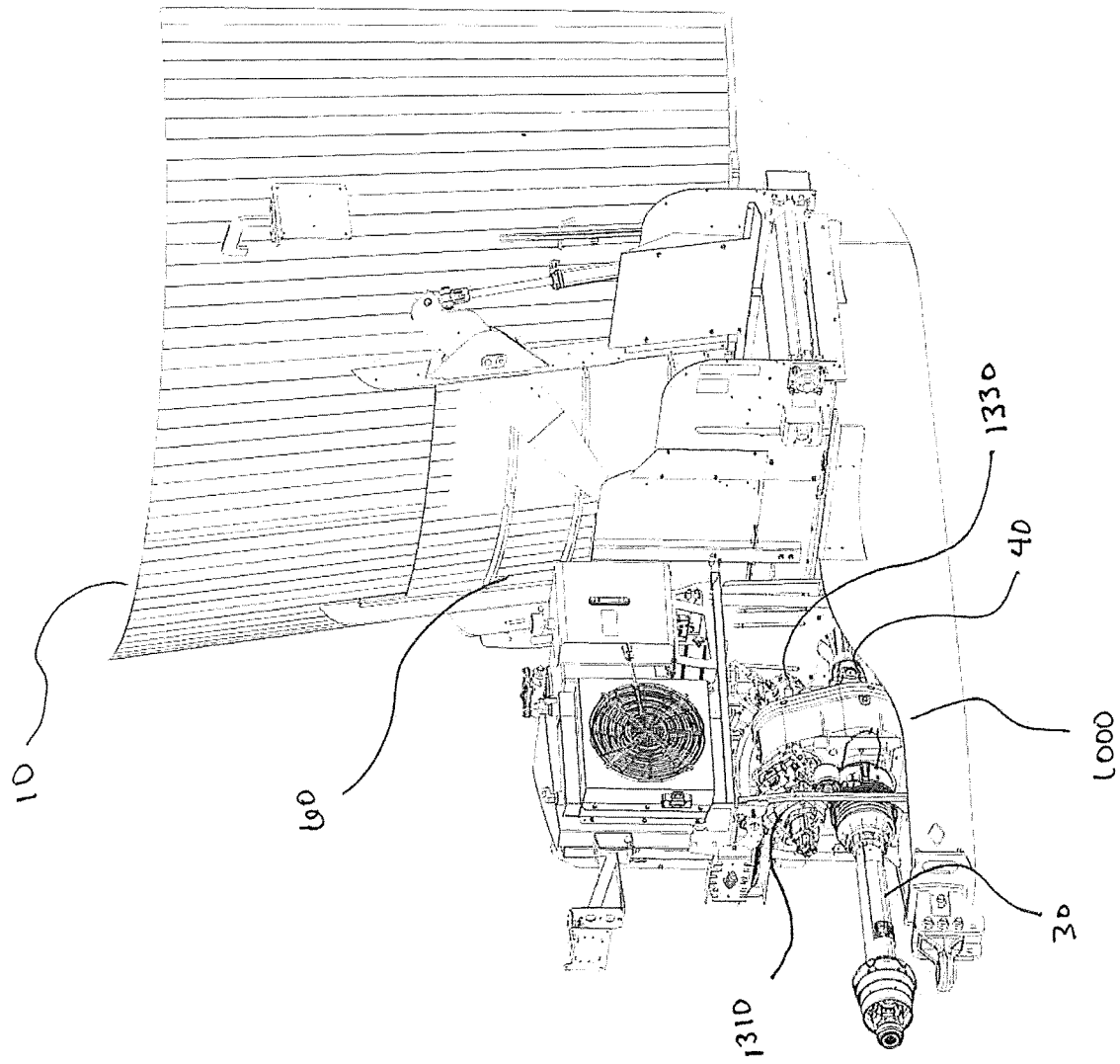
FIG. 2 is a detailed view of the feed mixer according to one embodiment.

With reference to FIGS. 1-2, one example of a feed mixer includes a container 10 that receives materials for mixing, a mixing members 20 that mixes the materials in the container 10; a transmission system including a continuously variable transmission (CVT) 1000; a first driveline 30 to transfer power to the transmission system, a second driveline 40 to transfer power from the transmission system to a mixing member gearbox 50, and a first opening 60 for discharging the materials from the container 10. The mixing member 20 is drivingly attached to the mixing member gearbox 50. In one embodiment, the mixer may include a plurality of mixing members that are each drivingly attached to a plurality of mixing member gearboxes, in which the plurality of mixing members are driven by power provided by the transmission system. The mixing members may be in a vertical orientation or in a horizontal orientation.

The CVT 1000 includes a mechanical loop and a hydrostatic loop. The mechanical loop includes a housing 1210, an input 1220, a first pump drive 1230, a first motor drive 1240, an output 1250, and a planetary gear set 1260. The input 1220 receives rotational input power from a power source 2000 through the first driveline 30. The power source 2000 may be a tractor, a truck, an electric motor, or the like.

The hydrostatic loop includes a first pump 1310 driven by the first pump drive 1230 to create a primary flow of fluid. In one embodiment, the fluid is oil. The first pump 1310 may be a two-way flow variable displacement piston pump, a two-way fixed displacement pump, or the like. The primary flow of fluid travels through a closed circuit 1320 to a first motor 1330. The first motor 1330 then rotates because of the primary flow of fluid from the first pump 1310. The rotation of the first motor 1330 drivingly engages the output 1250, through the first motor drive 1240, to vary the rotation speed of the output 1250. The first motor drive 1240 may include gears, belts, or any other type of power transmission device. The hydrostatic loop further includes a reservoir 1340 which stores fluid for replacing the volume of fluid lost to internal leakage, and a system for incorporating that fluid in the reservoir into the closed circuit 1320. In one embodiment, the primary flow of fluid flowing through the closed circuit 1320 does not return to the reservoir.

In some embodiments, the hydrostatic loop of the CVT 1000 includes a cooling valve 6300 that allows a volume of oil from the closed loop 1320 to flow into the reservoir 1340. This creates an exchange of oil that allows for cooling of the closed circuit 1320. The cooling valve 6300 may allow a flow between 2 and 20 liters per minute. Also, the cooling valve 6300 may maintain an internal pressure within the first motor 1330 of between 10 and 1000 pounds per square inch. In a preferred embodiment, the cooling valve 6300 maintains an internal pressure within the first motor 1330 between 200 and 400 pounds per square inch.

Figure 3:
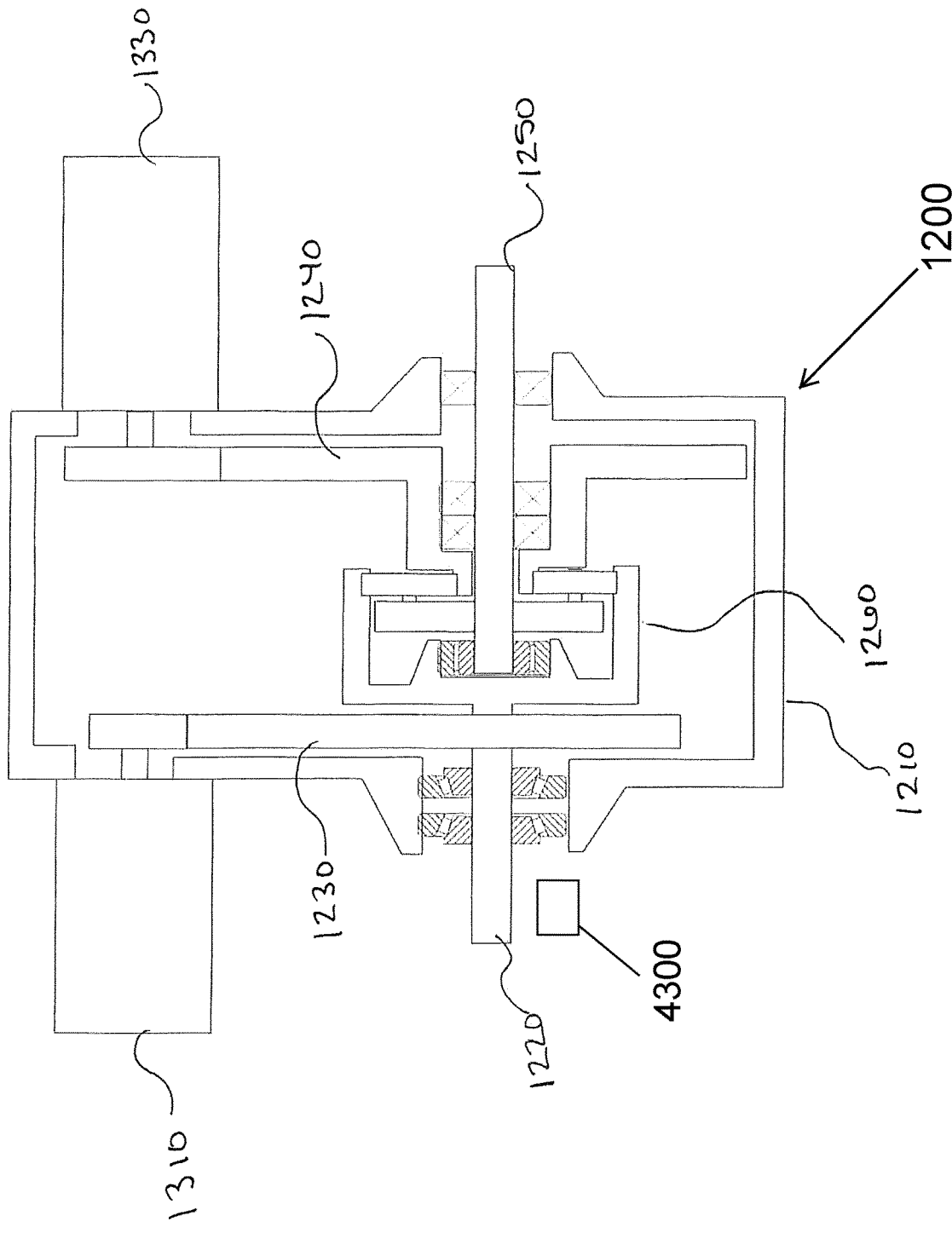
FIG. 3 is a cross-sectional view of a gearbox of the CVT according to one embodiment.

The CVT 1000 includes a gearbox 1200 including portions of the mechanical loop and the hydrostatic loop, as shown in FIG. 3.

A goal of the present disclosure to prevent the mechanical loop of the CVT 1000 from overtaking the hydrostatic loop of the CVT 1000, the overtaking occurring when there is insufficient pressure and a lack of fluid in the closed circuit 1320 of the CVT 1000. At start-up, there is a significant amount of torque resisting the rotation of the output 1250. When the input 1220 rotates, the mechanical loop and the hydrostatic loop begin to rotate. Due to the internal leakage in the closed circuit 1320, the functional portion of the first motor 1330 loses pressure when the first pump 1310 stops. As such, the first pump 1310 has to build pressure in the closed circuit 1320 before the first motor 1330 will begin to rotate. In the meantime, the mechanical loop of the CVT 1000 is already rotating the first motor 1330 at a first speed. Simultaneously, the first flow of fluid from the first pump 1310 is trying to rotate the first motor 1330 at a second speed that is slower than the first speed. When operating correctly, the pressure in the closed circuit 1320 slows the rotation of the first motor 1330 to a predetermined speed to create the desired output speed. However, once the mechanical loop has begun to rotate the first motor 1330, the first pump 1310 may be unable to create enough flow to match the rotation at the first speed. Meanwhile, the first motor 1330 runs without oil, which can quickly cause major damage and lead to failure of the first motor 1330.

This problem of the mechanical loop overtaking the hydrostatic loop can be avoided by assuring that under any circumstance, the pressure in the closed circuit 1320 of the CVT 1000 is established prior to rotation of the input 1220 of the CVT 1000. However, this may not be practical in all cases. Accordingly, a solution to the problem may be the establishment of pressure in the closed circuit 1320 the moment following the rotation of the input 1220 or the command to rotate the input 1220, before the rotation of the output 1250, or prior to the output 1250 of the CVT 1000 developing significant rotational momentum.

Figure 4:
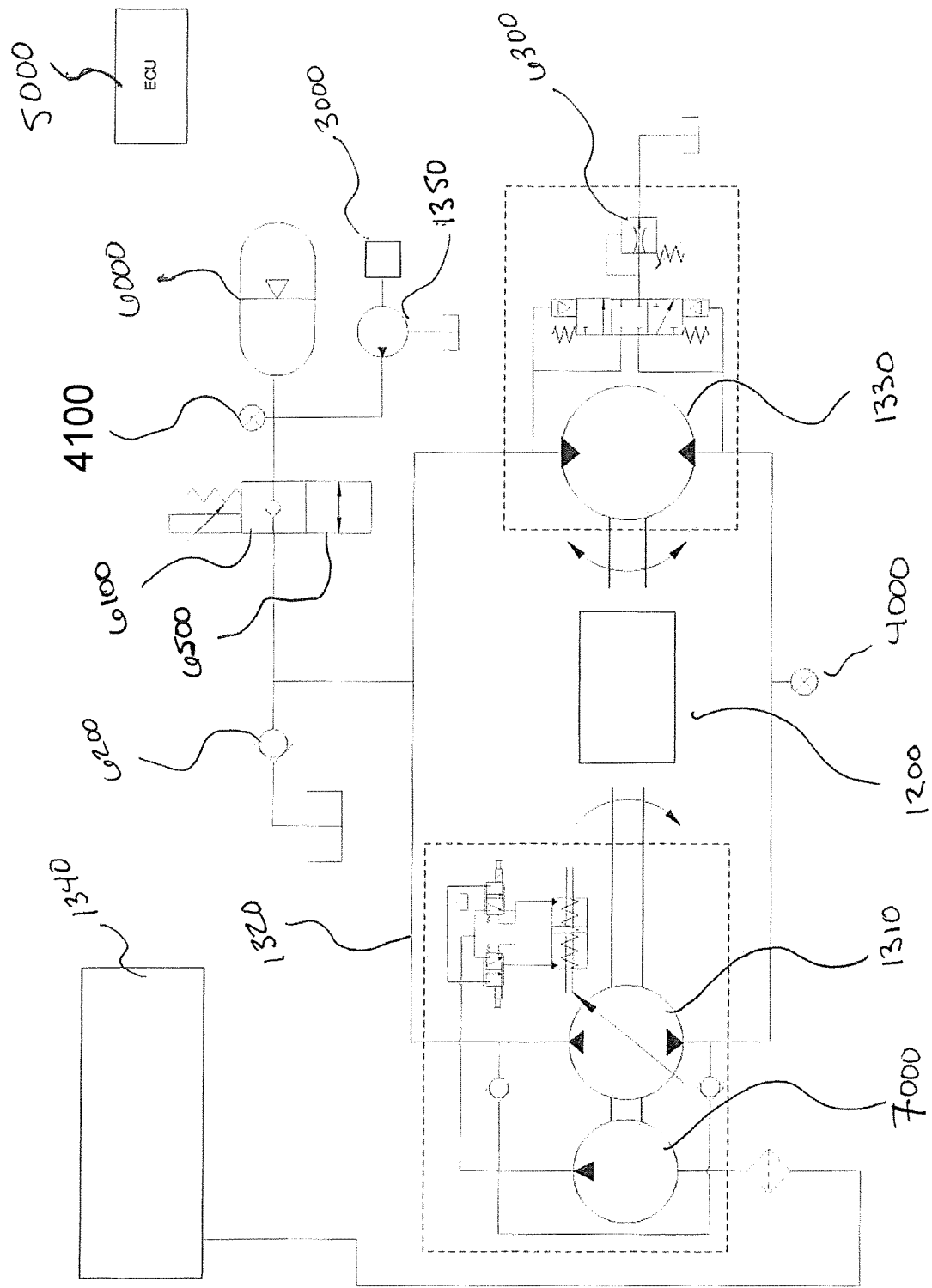
FIG. 4 is a schematic view of a hydrostatic loop of the CVT according to one embodiment.

In one embodiment shown in FIG. 4, the transmission system includes a second pump 1350 to replace the volume of fluid lost to the internal leaks in the closed circuit 1320 and to allow for some exchange of oil for cooling. The second pump 1350 creates a secondary flow of fluid, separate from the primary flow of fluid, to incorporate into the closed circuit 1320.

In one embodiment, a secondary input 3000 operates the second pump 1350 to create the secondary flow of fluid prior to any rotation of the mechanical loop of the CVT 1000 and therefore before the creation of the primary flow of fluid. The secondary input may be an electric motor, a hydraulic motor, a mechanical input such as a rotational input or a manual hand pump, or the like.

In another embodiment, the second pump 1350 may be independent from the input 1220 of the CVT 1000, so as to be able to create the second flow of fluid independent of the rotation of the input 1220 of the CVT 1000.

In some embodiments, an electronic control unit ECU 5000 is provided. The ECU 5000 may control the operation of the CVT 1000, the power source 2000, and the secondary input 3000. The ECU 5000 may include a processor and a computer readable storage medium. The ECU 5000 may be provided on the feed mixer, on a vehicle towing the feed mixer, or a location remote from the feed mixer.

In some embodiments, a sensor 4000 is provided. In one embodiment, the sensor 4000 may provide a signal representative of the pressure in the closed circuit 1320 of the CVT 1000. In another embodiment, the sensor 4000 may provide a signal representative of the flow of fluid in the closed circuit 1320 of the CVT 1000.

In other embodiments, the sensor may be a speed sensor 4300 and may provide a signal representative of the rotational speed of at least one of the input 1220, the output 1250, the planetary gear set 1260, the first pump 1310, and the first motor 1330 of the CVT 1000.

The signal from the sensor 4000 may be used by ECU 5000 to control the secondary input 3000. When the pressure in the closed circuit 1320 drops below a predetermined threshold, the secondary input 3000 may drive the second pump 1350 to reestablish the desired pressure in the closed circuit 1320.

In some embodiments, the hydrostatic loop includes a hydraulic accumulator 6000 that stores a certain volume of fluid at a given pressure to incorporate the pressure into the closed circuit 1320. The second pump 1350 operated by the second input 3000 pressurizes the accumulator 6000. The fluid from the accumulator 6000 pressurizes the closed circuit 1320 of the CVT 1000 and lubricates the first pump 1310 and the first motor 1330. A sensor 4100 may be provided, in which the sensor 4100 provides a signal representative of the pressure in the accumulator 6000.

In some embodiments, a first valve 6100 and a second valve 6500 are provided. The first valve 6100 may manage the pressure in the accumulator 6000. The first valve 6100 may be a non-return valve or a pilot-operated valve. The second valve 6500 allows the stored pressure from the accumulator 6000 into the closed circuit 1320.

In some embodiments, the hydrostatic loop of the CVT 1000 includes a non-return valve 6200 between the closed circuit 1320 and the reservoir 1340. The non-return valve 6200 allows fluid from the reservoir 1340 to flow into the closed circuit 1320 to prevent the formation of a vacuum in the closed circuit 1320. In one embodiment, the non-return valve 6200 allows flow when the pressure in the closed circuit 1320 is below 10 pounds per square inch. In a preferred embodiment, the non-return valve 6200 allows flow when the pressure in the closed circuit 1320 is below 1 pound per square inch.

In one embodiment, the accumulator 6000 may incorporate pressure into the closed circuit 1320 prior to the rotation of the input 1220.

In another embodiment, the accumulator 6000 may incorporate pressure into the closed circuit 1320 after the rotation of the input 1220, but before rotation of the output 1250. In an alternate embodiment, the accumulator 6000 may incorporate pressure into the closed circuit 1320 after the rotation of the input 1220, but before the rotation of the first motor 1330 has reached the second speed. The determination of the rotation of the input 1220, the rotation of the output 1250, and the rotation of the first motor 1330 may be performed by the speed sensor 4300.

The volume of the hydraulic accumulator 6000 may be able to supply the volume of the fluid that leaks from the closed circuit 1320 after the rotation of the input 1220 to the CVT 1000 has stopped. In some embodiments, the volume of the hydraulic accumulator 6000 is able to supply one to five times the volume of the fluid that leaks from the closed circuit 1320 after the rotation of the input 1220 to the CVT 1000 has stopped.

In some embodiments, the hydrostatic loop of the CVT 1000 includes a direct-drive pump 7000. The direct-drive pump 7000 is driven by the input 1220 of the CVT 1000, thereby creating a direct flow of fluid dependent on the rotation of the input 1220 to the CVT 1000. The direct-drive pump 7000 provides the necessary volume of flow to account for internal leakage of the closed circuit 1320 during normal operation.

In some embodiments, the direct-drive pump 7000 pressurizes the accumulator 6000 while the mechanical loop of the CVT 1000 is rotating. However, the accumulator 6000 loses pressure when the input 1220 to the CVT 1000 is not rotating. To account for pressure loss, the second pump 1350, which is driven by a second input 3000, pressurizes the accumulator 6000 prior to the rotation of the input 1220 to the CVT 1000 if the pressure in the accumulator 6000 drops below a predetermined threshold.

Figure 5:
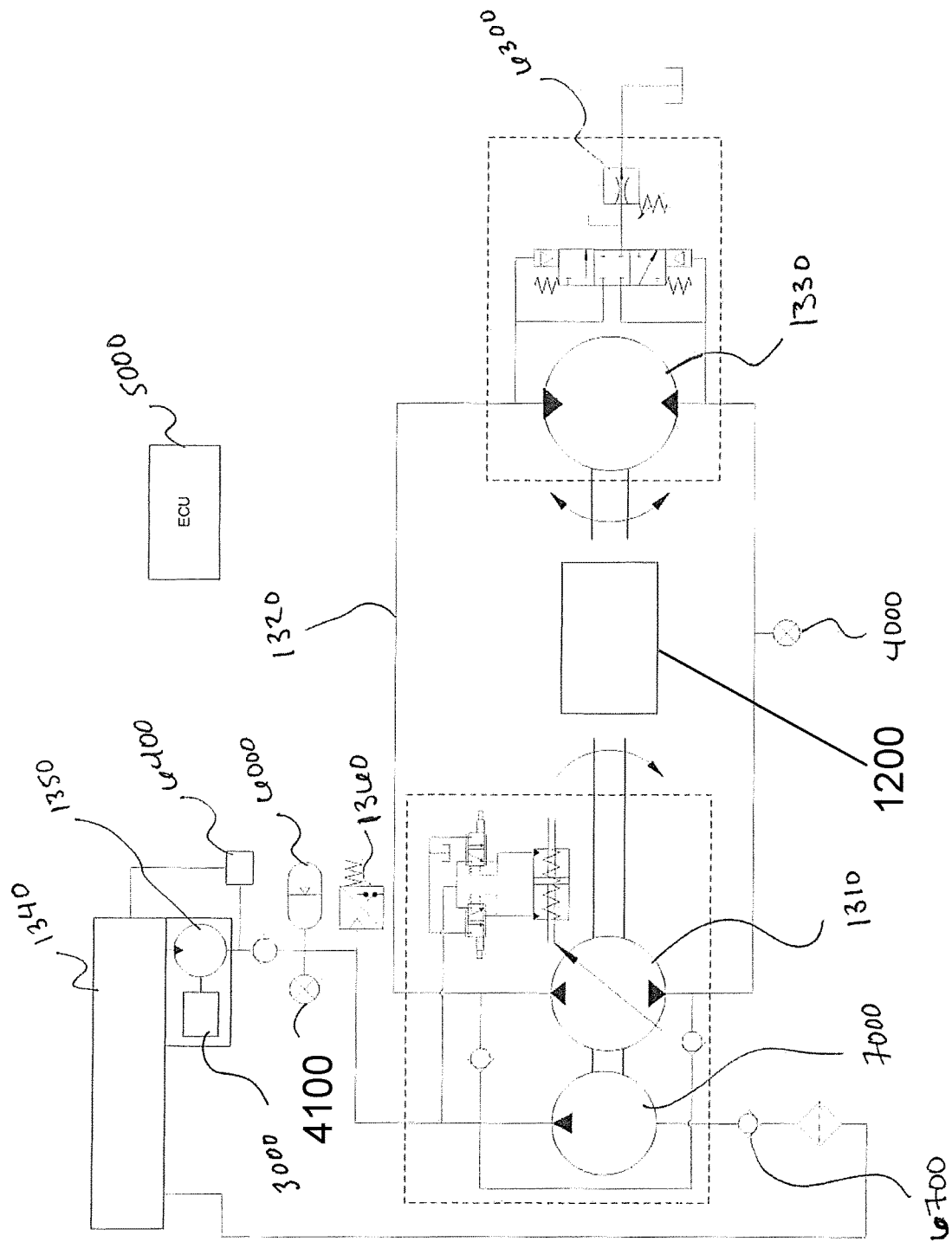
FIG. 5 is a schematic view of a hydrostatic loop of the CVT according to another embodiment.

In an alternate embodiment shown in FIG. 5, the second pump 1350 draws fluid from the reservoir 1340 to provide a volume of fluid to incorporate into the closed circuit 1320 to replace the fluid lost to internal leakage.

A valve 6400 allows the excess flow to return to the reservoir. A switch 1360 provides a signal to the ECU 5000 to control the secondary input 3000. The signal provided by the switch 1360 may be representative of the pressure in the closed circuit 1320. A third valve 6700 prevents the flow from the accumulator 6000 from returning to the reservoir 1340.

Figure 6:
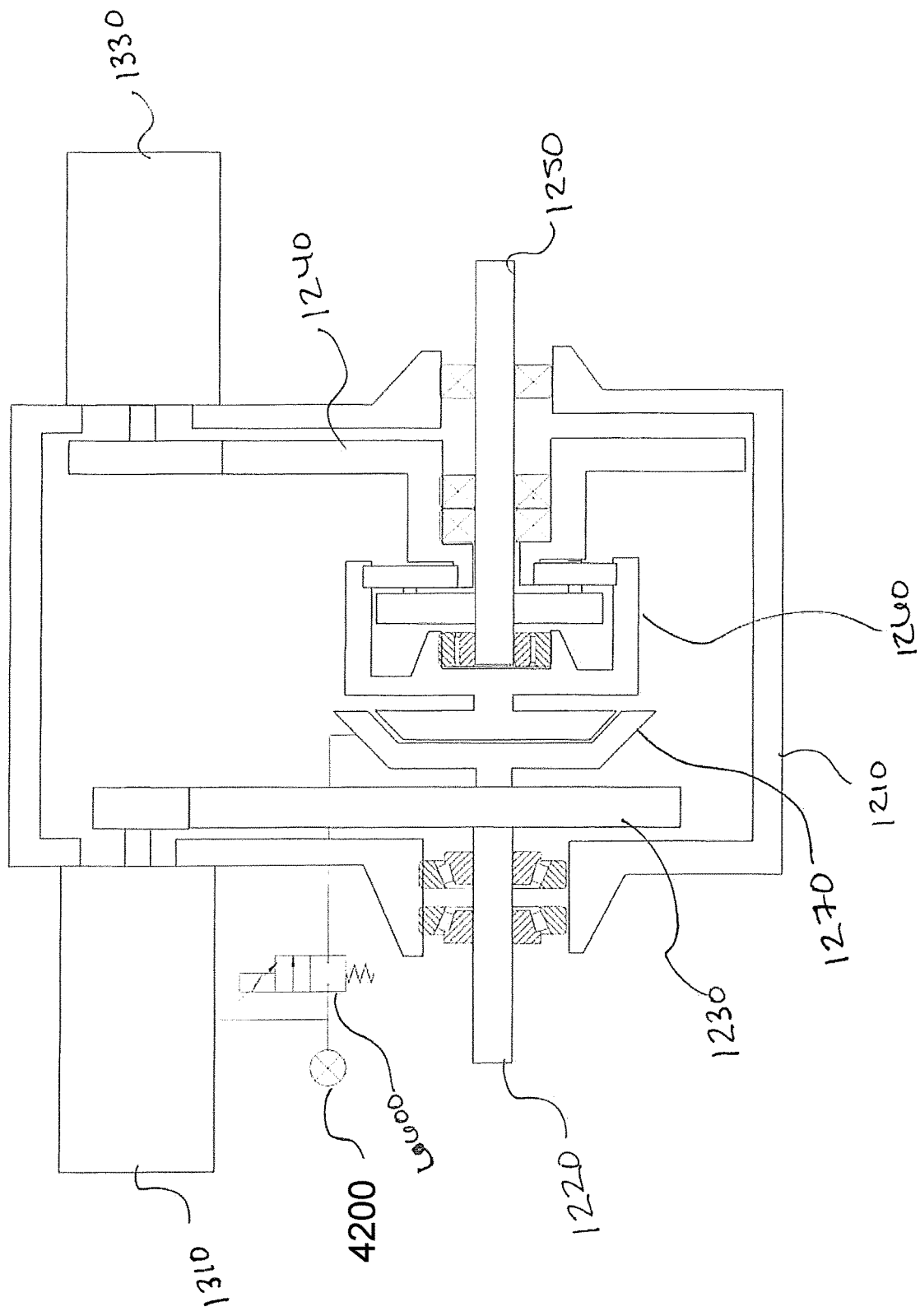
FIG. 6 is a cross-sectional view of a gearbox of the CVT according to another embodiment.

In one embodiment, the mechanical loop of the CVT 1000 includes a clutch. In one embodiment shown in FIG. 6, the clutch 1270 is disposed between the input 1220 and the output 1250 to disrupt the transmission of power through the mechanical loop of the CVT 1000. Specifically, the clutch 1270 may be provided between the first pump drive 1230 and the planetary gear set 1260. The clutch 1270 may disconnect the rotation to the planetary gear set 1260, while allowing the rotation of the first pump drive 1230. The rotation of the first pump drive 1230 rotates the first pump 1310 and the direct-drive pump 7000 to pressurize the hydrostatic loop of the CVT 1000 and provide volume of fluid necessary to replace internal leakage of the closed circuit 1320, before the output 1250 of the CVT 1000 begins to rotate.

In one embodiment, a valve 6600 controls the actuation of the clutch 1270 when the pressure in the in the closed circuit 1320 of the CVT 1000 reaches a predetermined threshold. The valve 6600 may be a pilot-operated valve. A sensor 4200 may be provided to measure the pressure at the valve 6600.

In another embodiment, the ECU 5000 controls the actuation of the clutch 1270 when the signal from the sensor 4000 indicates that pressure in the closed circuit 1320 of the CVT 1000 reaches a predetermined threshold. In one embodiment, the ECU 5000 controls the actuation of the clutch 1270 when the signal from the sensor 4200 indicates that pressure in the valve 4200 reaches a predetermined threshold.

Figure 7:
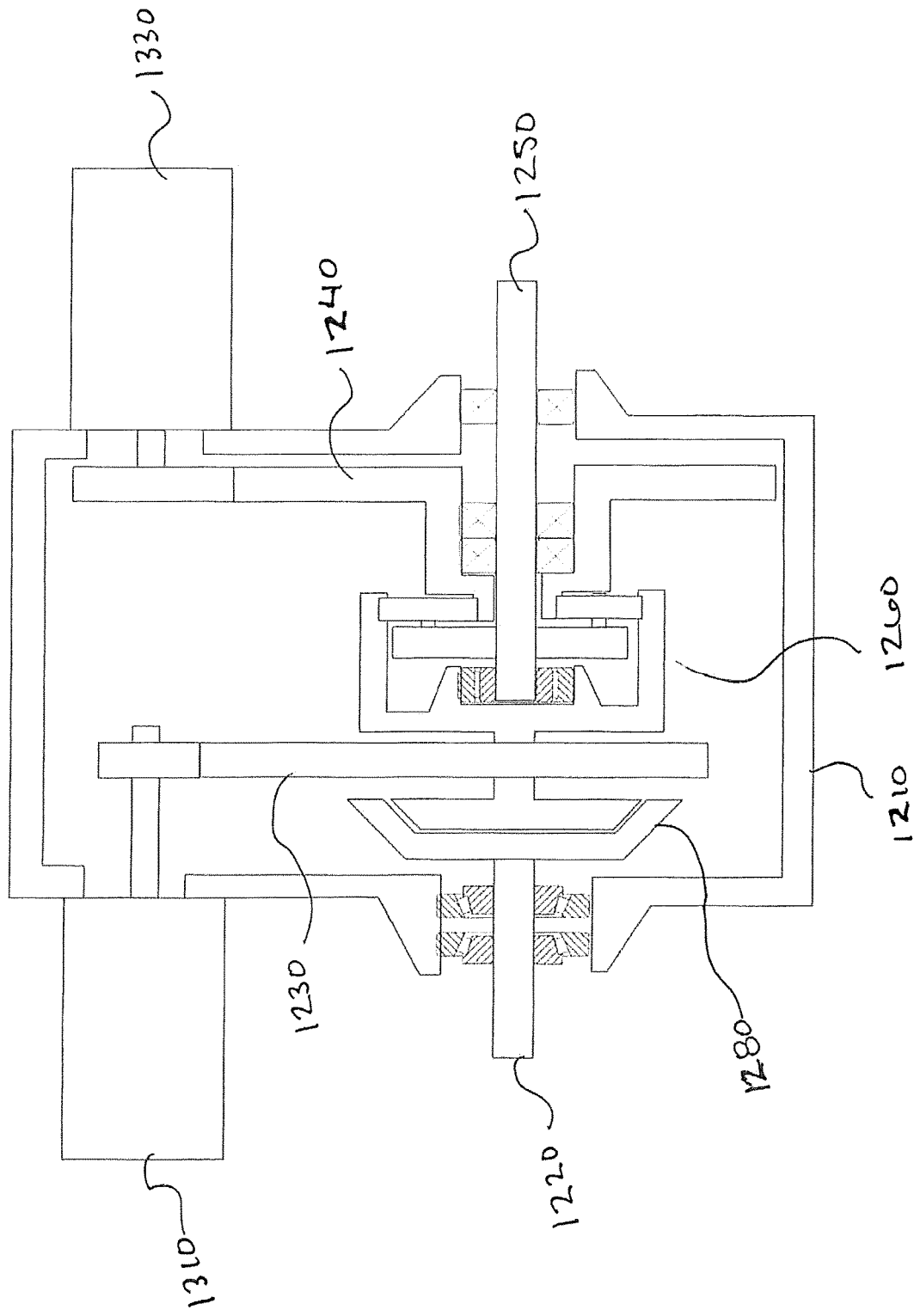
FIG. 7 is a cross-sectional view of a gearbox of the CVT according to one embodiment.

In another embodiment, the mechanical loop of the CVT 1000 includes a second clutch 1280, as shown in FIG. 7. The second clutch 1280 is at the input 1220 of the CVT 1000. The second clutch 1280 disconnects the rotation of the input 1220 from the remaining elements of the CVT 1000.

The ECU 5000 controls the actuation of the second clutch 1280. In the event of a fault in the feed mixer, including in the transmission system, the ECU 5000 disconnects the rotation of the input 1220 from the remaining elements of the CVT 1000 to prevent further damage to CVT 1000, the transmission system, and the feed mixer.

In one embodiment, the fault includes a failure of at least one component of the feed mixer. In another embodiment, the fault includes a failure of at least one component of the transmission system. In alternate embodiments, the fault includes operation of the feed mixer outside of a safe operating range based on at least one of a temperature sensor, a pressure sensor, a speed sensor, and a position sensor.

Figure 8:
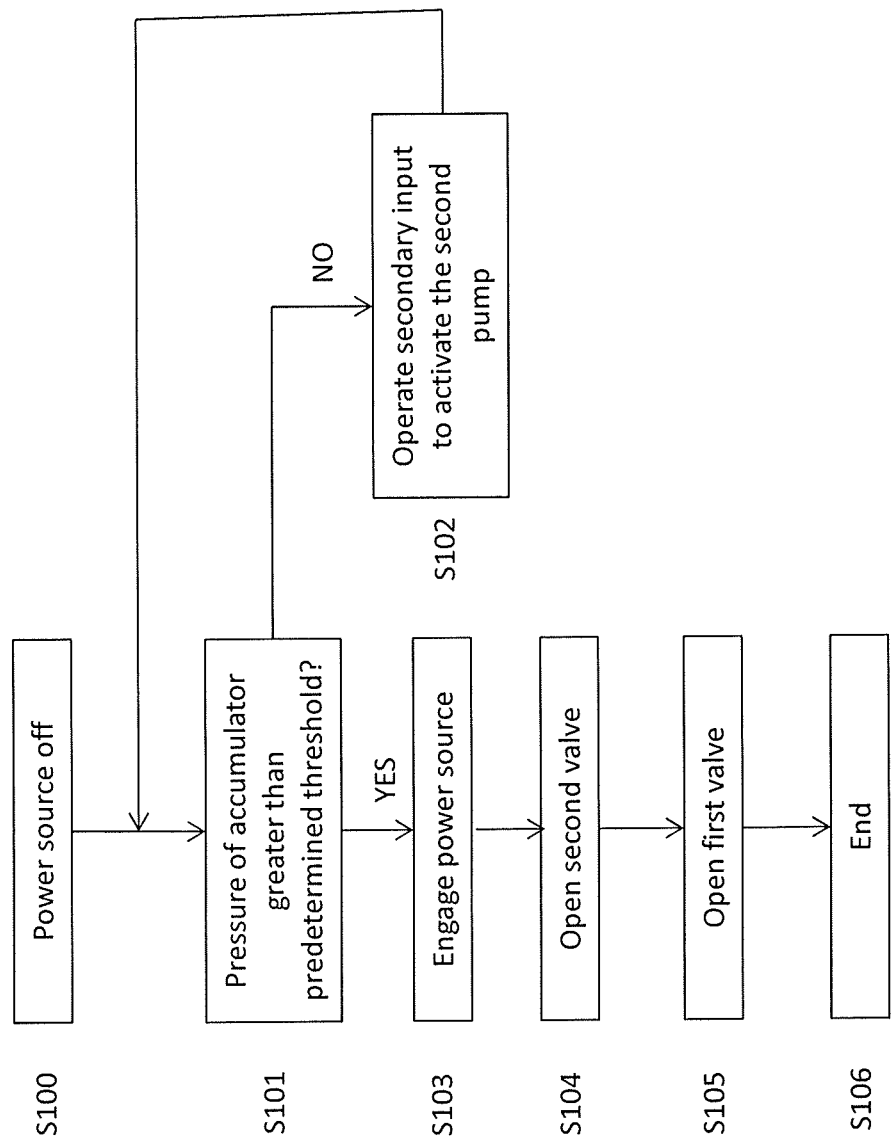
FIG. 8 is a control algorithm of the CVT according to one embodiment.

In one embodiment, a CVT start up control is provided using the accumulator 6000 for incorporating pressure into the closed circuit 1320 at a start of the power source 2000, as shown in FIG. 8. The CVT start up control may be executed by the ECU 5000.

At step S100, the power source 2000 is off. At step S101, a determination is made whether the pressure in the accumulator 6000 is greater than a predetermined threshold. In one embodiment, this determination is made using the sensor 4100.

If the pressure in the accumulator 6000 is less than the predetermined threshold, the secondary input 3000 is turned on to activate the second pump 1350 to charge the accumulator 6000 at step S102.

If the pressure in the accumulator 6000 is greater than the predetermined threshold, the power source 2000 is turned on and engaged at step S103.

At step S104, the second valve 6500 is opened to release the pressure in the accumulator 6000 into the closed circuit 1320.

At step S105, the first valve 6100 is opened to allow the direct-drive pump 7000 to charge the accumulator 6000 while the power source 2000 is on. In some embodiments, the first valve 6100 is opened after a predetermined time has elapsed after the second valve 6500 is opened. In other embodiments, the first valve 6100 is opened after a predetermined condition has been met, such as a pressure in the accumulator 6000 being below a predetermined threshold.

At step S106, the CVT start up control ends.

In an alternate embodiment, the second valve 6500 is opened to release the pressure in the accumulator 6000 into the closed circuit 1320 at S104 when it is determined that at least one of the input 1220, the output 1250, the planetary gear set 1260, the first pump 1310, and the first motor 1330 of the CVT 1000 is rotating using the speed sensor 4300.

Figure 9:
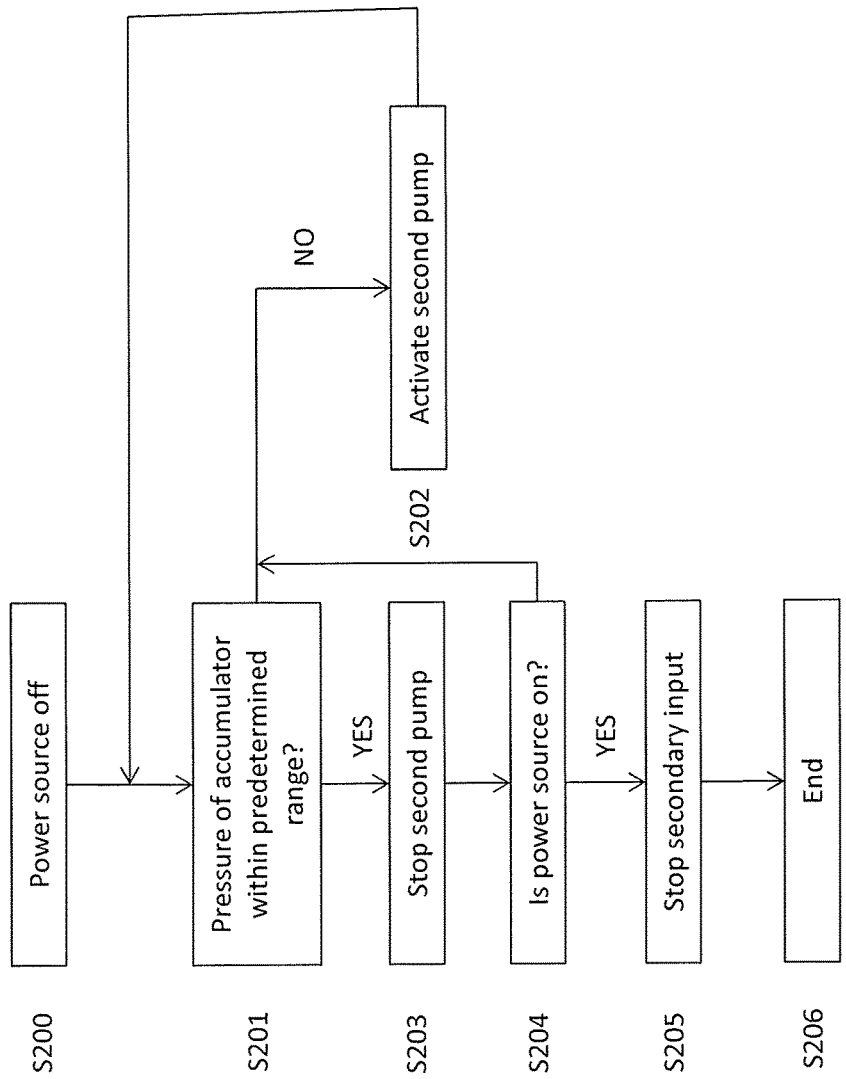
FIG. 9 is a control algorithm of the CVT according to another embodiment.

In another embodiment, a CVT start up control is provided using the second pump having a separate input source to maintain pressure in the CVT 1000 before the start of the power source 2000, as shown in FIG. 9. The CVT start up control may be executed by the ECU 5000.

At step 200, the power source 2000 is off. At step 201, it is determined if the pressure in the accumulator 6000 is within a predetermined range. In one embodiment, this determination is made using the sensor 4100.

If the pressure in the accumulator 6000 is determined to be not within the predetermined range, the second pump 1350 is activated by activating the secondary input 3000 at step S202.

If the pressure in the accumulator 6000 is determined to be within the predetermined range, the second pump 1350 is stopped by stopping the secondary input 3000 at step S203.

At step 204, it is determined if the power source 2000 is on. In one embodiment, this determination is made by detecting a speed of the first pump 1310. If the power source 2000 is determined not to be on, step S201 of determining if the pressure in the accumulator 6000 is within the predetermined range is repeated.

If the power source 2000 is determined to be on, the secondary input 3000 is stopped at step S205.

At step S206, the CVT start up control ends.

Figure 10:
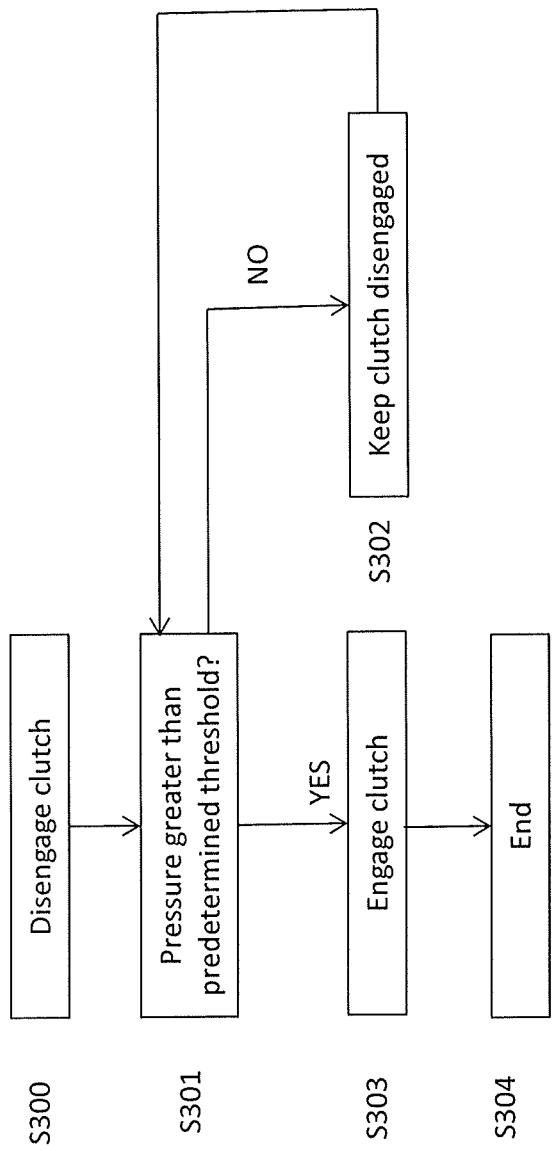
FIG. 10 is a control algorithm of the CVT according to one embodiment.

In one embodiment, a CVT start up control is provided using the clutch 1270, as shown in FIG. 10. The CVT start up control may be executed by the ECU 5000. This CVT start up control may be executed before the power source 2000 is started, or when the power source 2000 is operating.

At step S300, the clutch 1270 is disengaged.

At step S301, it is determined if a pressure is greater than a predetermined threshold. In one embodiment, this pressure is the pressure of the closed circuit 1320 which is determined using the sensor 4000. In another embodiment, this pressure is the pressure at the valve 6600 which is determined using the sensor 4200.

If the pressure is less than the predetermined threshold, the clutch 1270 remains disengaged at step S302.

If the pressure is greater than the predetermined threshold, the clutch 1270 is engaged at step S303. In one embodiment, the clutch 1270 is actuated using the valve 6600.

At step S304, the CVT start up control ends.

Although only certain embodiments of this invention have been described in detail above, those skilled in the art will readily appreciate that many modifications are possible in the exemplary embodiment without materially departing from the novel teachings and advantages of this invention. Accordingly, all such modifications are intended to be included within the scope of this invention.

The invention claimed is:

1. A feed mixer for mixing materials for livestock feed, comprising:
a container that receives materials;
a first driveline to transfer power from a power source;
a second driveline to transfer power to a first mixing member gearbox;
a first mixing member for mixing materials, drivingly attached to the first mixing member gearbox;
a first opening for discharging the material from the container; and
a transmission system,
wherein the transmission system includes a continuously variable transmission comprising a mechanical loop and a hydrostatic loop,
wherein the mechanical loop includes:
an input driven by the first driveline,
an output which drives the second driveline, and
a planetary gear set,
wherein the hydrostatic loop includes:
a first pump to create a primary flow of fluid,
a closed circuit,
a reservoir,
a first motor driven by the primary flow of fluid from the first pump, and
a second pump to create a secondary flow of fluid from the reservoir,
wherein the second pump is operated prior to rotation of the input to incorporate the secondary flow of fluid from the reservoir into the closed circuit, and
wherein the second pump is operated by a secondary input, independent of the input.

2. The feed mixer of claim 1, wherein the secondary input is controlled by a signal from a sensor.

3. The feed mixer of claim 2, wherein the hydrostatic loop includes an accumulator that is pressurized by the second pump.

4. The feed mixer of claim 1, wherein the secondary input is configured to supply a constant supply of pressure to the closed circuit.

5. The feed mixer of claim 4, wherein the hydrostatic loop includes a valve to allow excess flow to return to the reservoir.

6. The feed mixer of claim 5, wherein the hydrostatic loop includes an accumulator that is pressurized by the second pump.

7. The feed mixer of claim 1, further comprising a controller configured to operate the transmission system.

8. A feed mixer for mixing materials for livestock feed, comprising:
a container that receives materials;
a first driveline to transfer power from a power source;
a second driveline to transfer power to at least a first mixing member gearbox;
a first mixing member for mixing materials, drivingly attached to the first mixing member gearbox;
a first opening for discharging the material from the container;
a transmission system; and
a controller configured to operate the transmission system,
wherein the transmission system includes a continuously variable transmission comprising a mechanical loop and a hydrostatic loop,
wherein the mechanical loop includes:
an input driven by the first driveline,
an output which drives the second driveline, and
a planetary gear set,
wherein the hydrostatic loop includes:
a first pump to create a primary flow of fluid,
a closed circuit, a first motor driven by the primary flow of fluid from the first pump, a direct drive pump drivingly connected to the input to create a direct flow of fluid, and an accumulator to pressurize the closed circuit, and wherein the controller is configured to control the accumulator to pressurize the closed circuit prior to rotation of the input.

9. The feed mixer of claim 8, wherein the hydrostatic loop includes a valve to allow flow into the closed circuit.

10. The feed mixer of claim 9, wherein the transmission system includes a sensor that produces a signal representative of the rotation of the input.

11. The feed mixer of claim 10, wherein the signal from the sensor controls the valve to allow flow into the closed circuit.

12. The feed mixer of claim 11, wherein the hydrostatic loop includes a second pump to pressurize the accumulator, and wherein the controller is configured to operate the second pump when a pressure in the accumulator is below a predetermined value.

13. A feed mixer for mixing materials for livestock feed, comprising:

a container that receives materials;

a first driveline to transfer power from a power source;

a second driveline to transfer power to at least a first mixing member gearbox;

at least a first mixing member for mixing materials, drivingly attached to the first mixing member gearbox;

at least a first opening for discharging the material from the container; and a transmission system, wherein the transmission system includes a continuously variable transmission comprising a mechanical loop and a hydrostatic loop, the mechanical loop includes:

an input driven by the first driveline, an output which drives the second driveline, a planetary gear set, and a clutch provided between the input and the output, the hydrostatic loop includes:

a first pump to create a primary flow of fluid, a closed circuit, a first motor driven by the primary flow of fluid from the first pump, a direct drive pump drivingly connected to the input to create a direct flow of fluid, and wherein the clutch is configured to disengage when a pressure of the closed circuit is below a predetermined threshold, and is configured to engage when the pressure of the closed circuit is above the predetermined threshold.

14. The feed mixer of claim 13, wherein the mechanical loop includes a first pump drive which drives the first pump, and the clutch is provided between first pump drive and the planetary gear set.

15. The feed mixer of claim 13, further comprising a valve which controls actuation of the clutch.

16. The feed mixer of claim 13, further comprising a sensor which measures the pressure of the closed circuit, and a controller which controls the clutch, the controller is configured to disengage the clutch when the pressure of the closed circuit measured by the sensor is below the predetermined threshold, and to engage the clutch when the pressure of the closed circuit measured by the sensor is above the predetermined threshold.

* * * * *